United States Patent
Tsai

(10) Patent No.: US 8,325,430 B1
(45) Date of Patent: Dec. 4, 2012

(54) FIVE-PIECE IMAGING LENS MODULE

(75) Inventor: Fei-Hsin Tsai, Taichung (TW)

(73) Assignee: Newmax Technology Co., Ltd., Taichung (TW)

(*) Notice: Subject to any disclaimer, the term of this patent is extended or adjusted under 35 U.S.C. 154(b) by 0 days.

(21) Appl. No.: 13/224,034

(22) Filed: Sep. 1, 2011

(51) Int. Cl.
*G02B 13/18* (2006.01)
*G02B 9/60* (2006.01)

(52) U.S. Cl. ........................................ 359/714; 359/764

(58) Field of Classification Search ................ 359/714, 359/764, 766
See application file for complete search history.

(56) References Cited

U.S. PATENT DOCUMENTS

2011/0249348 A1* 10/2011 Kubota et al. ................. 359/764

* cited by examiner

*Primary Examiner* — William Choi

(57) ABSTRACT

The present invention provides a five-piece imaging lens module including a fixed diaphragm and an optical module. The optical module includes five lenses arranged from an object side to an image side in a sequence of: the first lens, having a positive refractive power, a concave surface, and having at least one aspheric surface; the diaphragm; the second lens, having a negative refractive power, a concave surface, and having at least one aspheric surface; the third lens, having a positive refractive power, a convex surface, and having at least one aspheric surface; the fourth lens, having a concave surface, and having at least one aspheric surface; the fifth lens, having a convex on the object side near to the optic axis, and having at least one aspheric surface. With the fifth lens, the present invention provides a better resolving power.

18 Claims, 17 Drawing Sheets

Non-point aberration and distorted aberration

Spherical surface aberration

Focal length : f = 4.47 mm
(F NO.) : F 2.8
Viewing angle : 2ω= 65°

| Surf | Radius | Thickness | nd | Vd |
|---|---|---|---|---|
| OBJ | Infinity | Infinity | | |
| 1 | Infinity | 0 | | |
| 2 | 1.390736 | 0.65056 | | |
| 3 | 18.20729 | 0.065 | 1.535 | 56 |
| STO | Infinity | 0.031369 | | |
| 5 | -36.7951 | 0.407313 | 1.632 | 23 |
| 6 | 3.469295 | 0.701938 | | |
| 7 | -2.09808 | 0.8 | 1.535 | 56 |
| 8 | -0.96725 | 0.365183 | | |
| 9 | -2.3506 | 0.477669 | 1.535 | 56 |
| 10 | 2.679997 | 0.208896 | | |
| 11 | 12.29741 | 0.4 | 1.535 | 56 |
| 12 | 277.7628 | 0.1 | | |
| 13 | Infinity | 0.3 | 1.5168 | 64.167336 |
| 14 | Infinity | 0.608504 | | |
| IMA | Infinity | | | |

FIG. 1B

SURFACE DATA DETAIL:

| Surface 2 | | Surface3 | |
|---|---|---|---|
| K : | 0.3281959 | K : | -1870.04 |
| A : | -0.00027 | A : | 0.069317 |
| B : | -0.01035 | B : | -0.14242 |
| C : | 0.045249 | C : | 0.067241 |
| D : | -0.06148 | D : | -0.0575 |
| E : | 0.018854 | E : | -0.16731 |
| Surface5 | | Surface 6 | |
| K : | -74.8967 | K : | -14.53903 |
| A : | 0.034573 | A : | 0.120492 |
| B : | -0.17036 | B : | -0.00647 |
| C : | 0.162647 | C : | -0.1243 |
| D : | -0.36546 | D : | 0.27112 |
| E : | 0.108558 | E : | -0.12228 |
| Surface 7 | | Surface8 | |
| K : | 2.651176 | K : | -1.1197 |
| A : | -0.10791 | A : | 0.03128 |
| B : | 0.116036 | B : | -0.04613 |
| C : | -0.12671 | C : | 0.019442 |
| D : | 0.104815 | D : | 0.003862 |
| E : | -0.04511 | E : | -0.00247 |
| Surface9 | | Surface10 | |
| K : | -5.43183 | K : | -27.6117 |
| A : | -0.00058 | A : | -0.03677 |
| B : | 0.008937 | B : | 0.003801 |
| C : | -0.00205 | C : | -0.00106 |
| D : | -7.12E-05 | D : | 0.000166 |
| E : | 2.94E-05 | E : | -1.69E-05 |
| Surfac 11 | | Surfac 12 | |
| K : | -1227.94 | K : | -1500 |
| A : | -0.0285 | A : | -0.02524 |
| B : | 0.00057 | B : | 0.001794 |
| C : | 0.000138 | C : | 0.000104 |
| D : | 1.47E-05 | D : | -9.29E-06 |
| E : | -1.39E-06 | E : | -1.24E-06 |

FIG. 1C

Non-point aberration and distorted aberration

Spherical surface aberration

Focal length : f = 4.94 mm (F NO.) : F 2.8

Viewing angle : 2ω = 60°

| Surf | Radius | Thickness | nd | Vd |
|---|---|---|---|---|
| OBJ | Infinity | Infinity | | |
| 1 | Infinity | 0 | | |
| 2 | 1.371223 | 0.774901 | | |
| 3 | 16.17323 | 0.104596 | 1.535 | 56 |
| STO | Infinity | 0.033035 | | |
| 5 | -27.5824 | 0.308357 | 1.632 | 23 |
| 6 | 3.29972 | 0.776841 | | |
| 7 | -2.51275 | 0.732781 | 1.535 | 56 |
| 8 | -1.06516 | 0.297661 | | |
| 9 | -2.3398 | 0.35 | 1.535 | 56 |
| 10 | 2.282865 | 0.251798 | | |
| 11 | 8.640677 | 0.610129 | 1.535 | 56 |
| 12 | 378.1155 | 0.1 | | |
| 13 | Infinity | 0.3 | 1.5168 | 64.167336 |
| 14 | Infinity | 0.608504 | | |
| IMA | Infinity | | | |

FIG. 2B

SURFACE DATA DETAIL:

| Surface 2 | | Surface 3 | |
|---|---|---|---|
| K : | 0.287213 | K : | -2000 |
| A : | -0.00449 | A : | 0.063503 |
| B : | -0.02161 | B : | -0.14712 |
| C : | 0.0457 | C : | 0.091537 |
| D : | -0.0577 | D : | -0.0021 |
| E : | 0.014724 | E : | -0.16721 |
| Surface 5 | | Surface 6 | |
| K : | 362.4771 | K : | -9.12801 |
| A : | 0.037516 | A : | 0.12915 |
| B : | -0.15937 | B : | -0.00113 |
| C : | 0.177642 | C : | -0.1209 |
| D : | -0.35917 | D : | 0.288174 |
| E : | 0.163646 | E : | -0.13772 |
| Surface 7 | | Surface 8 | |
| K : | 2.237805 | K : | -1.23205 |
| A : | -0.08844 | A : | 0.050857 |
| B : | 0.116528 | B : | -0.03073 |
| C : | -0.13133 | C : | 0.019918 |
| D : | 0.098012 | D : | 0.002833 |
| E : | -0.03521 | E : | -0.00317 |
| Surface 9 | | Surface 10 | |
| K : | -4.30987 | K : | -24.4347 |
| A : | -0.00225 | A : | -0.03539 |
| B : | 0.009632 | B : | 0.004839 |
| C : | -0.00194 | C : | -0.00116 |
| D : | -7.51E-05 | D : | 0.000152 |
| E : | 2.27E-05 | E : | -1.41E-05 |
| Surface 11 | | Surface 12 | |
| K : | -506.667 | K : | -1500 |
| A : | -0.02801 | A : | -0.03121 |
| B : | 0.000892 | B : | 0.001454 |
| C : | 0.000169 | C : | 0.000133 |
| D : | 1.85E-05 | D : | -3.41E-06 |
| E : | -1.51E-06 | E : | 3.06E-07 |

FIG. 2C

Non-point aberration and distorted aberration

Spherical surface aberration

Focal length : f = 4.82 mm (F NO.) : F 2.8

Viewing angle : 2ω= 61°

| Surf | Radius | Thickness | nd | Vd |
|---|---|---|---|---|
| OBJ | Infinity | Infinity | | |
| 1 | Infinity | 0 | | |
| 2 | 1.29505 | 0.659444 | | |
| 3 | 13.92426 | 0.107834 | 1.535 | 56 |
| STO | Infinity | 0.004578 | | |
| 5 | 14.50229 | 0.300012 | 1.632 | 23 |
| 6 | 2.28181 | 0.806479 | | |
| 7 | -1.85656 | 0.608056 | 1.535 | 56 |
| 8 | 1.006016 | 0.1 | | |
| 9 | -4.70257 | 0.57657 | 1.535 | 56 |
| 10 | 2.434132 | 0.383107 | | |
| 11 | 15.5832 | 0.527954 | 1.632 | 23 |
| 12 | 20.66873 | 0.2 | | |
| 13 | Infinity | 0.3 | 1.5168 | 64.167336 |
| 14 | Infinity | 0.608504 | | |
| IMA | Infinity | | | |

FIG. 3B

SURFACE DATA DETAIL:

| Surface 2 | | Surface 3 | |
|---|---|---|---|
| K : | 0.304903 | K : | -478.601 |
| A : | -0.00382 | A : | 0.08957 |
| B : | -0.00525 | B : | -0.09076 |
| C : | 0.01967 | C : | 0.041984 |
| D : | -0.02438 | D : | 0.081958 |
| E : | 0.018729 | E : | -0.17108 |
| Surface 5 | | Surface 6 | |
| K : | -152.916 | K : | -3.91463 |
| A : | 0.074569 | A : | 0.138076 |
| B : | -0.20138 | B : | -0.02644 |
| C : | 0.211605 | C : | -0.05393 |
| D : | -0.22762 | D : | 0.286697 |
| E : | -0.01533 | E : | -0.11236 |
| Surface 7 | | Surface 8 | |
| K : | 1.17235 | K : | -1.09726 |
| A : | -0.11049 | A : | 0.067444 |
| B : | 0.122075 | B : | -0.05457 |
| C : | -0.10682 | C : | 0.039755 |
| D : | 0.067925 | D : | 0.012923 |
| E : | -0.01014 | E : | -0.01002 |
| Surface 9 | | Surface 10 | |
| K : | -6.48433 | K : | -20.5946 |
| A : | -0.00135 | A : | -0.03687 |
| B : | 0.011908 | B : | 0.00444 |
| C : | -0.00261 | C : | -0.00157 |
| D : | 0.000143 | D : | 0.000172 |
| E : | 9.30E-08 | E : | 8.75E-06 |
| Surface 11 | | Surface 12 | |
| K : | -1430.5 | K : | -1500 |
| A : | -0.01023 | A : | -0.03065 |
| B : | -0.00415 | B : | 0.00163 |
| C : | 0.000113 | C : | 1.20E-05 |
| D : | 5.22E-05 | D : | 6.73E-06 |
| E : | 6.96E-06 | E : | 8.02E-07 |

FIG. 3C

Non-point aberration and distorted aberration

Spherical surface aberration

Focal length : f = 4.49 mm (F NO.) : F 2.8

Viewing angle : 2ω= 65°

| Surf | Radius | Thickness | nd | Vd |
|---|---|---|---|---|
| OBJ | Infinity | Infinity | | |
| 1 | Infinity | 0 | | |
| 2 | 1.259668 | 0.617716 | | |
| 3 | 9.55011 | 0.082883 | 1.535 | 56 |
| STO | Infinity | 0.001558 | | |
| 5 | 7.955813 | 0.3 | 1.632 | 23 |
| 6 | 2.090871 | 0.758817 | | |
| 7 | -1.8002 | 0.492715 | 1.535 | 56 |
| 8 | -1.01121 | 0.157214 | | |
| 9 | -5.66257 | 0.559754 | 1.535 | 56 |
| 10 | 2.31946 | 0.289937 | | |
| 11 | 13.89409 | 0.489988 | 1.632 | 23 |
| 12 | 37.81822 | 0.220916 | | |
| 13 | Infinity | 0.3 | 1.5168 | 64.167336 |
| 14 | Infinity | 0.608504 | | |
| IMA | Infinity | | | |

FIG. 4B

SURFACE DATA DETAIL:

| Surface 2 | | Surface 3 | |
|---|---|---|---|
| K : | 0.310064 | K : | -257.225 |
| A : | -0.00362 | A : | 0.08774 |
| B : | -0.00497 | B : | -0.09638 |
| C : | 0.024995 | C : | 0.043244 |
| D : | -0.01938 | D : | 0.057589 |
| E : | 0.015197 | E : | -0.27308 |
| Surface 5 | | Surface 6 | |
| K : | -162.837 | K : | -4.16338 |
| A : | 0.072276 | A : | 0.13964 |
| B : | -0.21264 | B : | -0.01235 |
| C : | 0.189555 | C : | -0.04894 |
| D : | -0.26874 | D : | 0.227612 |
| E : | -0.08636 | E : | -0.04814 |
| Surface 7 | | Surface 8 | |
| K : | 1.099117 | K : | -1.18429 |
| A : | -0.05767 | A : | 0.073317 |
| B : | 0.102276 | B : | -0.05626 |
| C : | -0.10793 | C : | 0.038334 |
| D : | 0.076225 | D : | 0.012956 |
| E : | -0.01283 | E : | -0.00981 |
| Surface 9 | | Surface 10 | |
| K : | 1.886633 | K : | -21.5584 |
| A : | -0.00604 | A : | -0.04175 |
| B : | 0.011407 | B : | 0.004359 |
| C : | -0.00273 | C : | -0.00156 |
| D : | 0.000133 | D : | 0.000118 |
| E : | 1.75E-05 | E : | -7.45E-06 |
| Surface 11 | | Surface 12 | |
| K : | -798.132 | K : | -1500 |
| A : | -0.01585 | A : | -0.03196 |
| B : | -0.00485 | B : | 0.001798 |
| C : | 0.000117 | C : | -0.00013 |
| D : | 5.99E-05 | D : | 5.76E-07 |
| E : | 8.38E-06 | E : | 3.51E-06 |

FIG. 4C

|  | 1st. Embodyment | 2nd. Embodyment | 3rd. Embodyment | 4th. Embodyment |
|---|---|---|---|---|
| \|f1\|/\|f2\| | -0.5591 | -0.5956 | -0.6095 | -0.5807 |
| \|f2\|/\|f3\| | -1.8469 | -1.5725 | -1.3094 | -1.2858 |
| \|f3\|/\|f4\| | -1.1871 | -1.3956 | -1.1263 | -1.1792 |
| \|f4\|/\|f5\| | -0.0942 | -0.1514 | -0.0305 | -0.0876 |
| \|f1\|/\|f2345\| | -0.6020 | -0.7684 | -0.7168 | -0.6404 |
| \|f12\|/\|f345\| | -0.0236 | -0.2073 | -0.1440 | -0.0665 |
| \|f123\|/\|f45\| | -1.0847 | -1.1521 | -1.0029 | -0.8876 |
| \|f/TL\| | 0.8743 | 0.9413 | 0.9297 | 0.9200 |

FIG. 5

FIVE-PIECE IMAGING LENS MODULE

BACKGROUND OF THE INVENTION

1. Field of the Invention

The present invention relates to the field of optical lenses, and more particularly to a five-piece imaging lens module capable of being installed in a miniature image-shooting device.

2. Description of the Prior Art

With the trend that shapes a digital camera in ways of lighter, thinner, shorter and smaller, the miniaturization of optical lenses also need to be upgraded.

Apart from basic needs of being lighter, thinner, shorter and smaller, an imaging quality of an optic module is also a key point when consumers purchase 3C products. In other words, optic lenses of high picture quality such as definition, color sharpness and saturation are disposed in 3C products and cater to the current consumer market.

Therefore, an inventor of the present invention invented a four-piece imaging lens module years ago with mainly focus on an optic lens of high pixel and high picture quality. Meanwhile, the four-piece imaging lens module also patented by the Taiwan Intellectual Property Office (TWI330723) and the United State Patent Office (U.S. Pat. No. 7,710,666).

As such, on the basis of the four-piece imaging lens module, the present invention is arisen to obviate or at least mitigate the above mentioned disadvantages.

SUMMARY OF THE INVENTION

The main object of the present invention is to provide a five-piece imaging lens module with ability to improve aberrations of spherical surfaces and of obtaining high picture quality.

The second object of the present invention is to provide a five-piece imaging lens module with high yield rate by using concaves of the first lens and the fourth lens, combining with an aspheric convex of the fifth lens to decrease the affect of system sensitivity errors.

To achieve the above and other objects, the present invention provides an imaging lens module including a fixed diaphragm and an optical module. The optical module includes a first lens, a second lens, a third lens, a fourth lens and a fifth lens arranged from an object side to an image side in a sequence of: the first lens, the diaphragm, the second lens, the third lens, the fourth lens and the fifth lens.

The first lens has a positive refractive power, a meniscus shape, a concave surface on the image side, and having at least one aspheric surface. The second lens has a negative refractive power, a meniscus shape, a concave surface on the image side, and having at least one aspheric surface. The third lens has a positive refractive power, a meniscus shape, a convex surface on the image side, and having at least one aspheric surface. The fourth lens has a concave surface on the object side, and having at least one aspheric surface. The fifth lens has a convex on the object side near to the optic axis, and having at least one aspheric surface.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric surface coefficients of an imaging lens module in accordance with a first preferred embodiment of the present invention;

FIG. 1C is a schematic view showing the data of optical features and aspheric surface coefficients of an imaging lens module in accordance with a first preferred embodiment of the present invention;

FIG. 2B is a schematic view showing the data of optical features and aspheric surface coefficients of an imaging lens module in accordance with a second preferred embodiment of the present invention;

FIG. 2C is a schematic view showing the data of optical features and aspheric surface coefficients of an imaging lens module in accordance with a second preferred embodiment of the present invention;

FIG. 3B is a schematic view showing the data of optical features and aspheric surface coefficients of an imaging lens module in accordance with a third preferred embodiment of the present invention;

FIG. 3C is a schematic view showing the data of optical features and aspheric surface coefficients of an imaging lens module in accordance with a third preferred embodiment of the present invention;

FIG. 4B is a schematic view showing the data of optical features and aspheric surface coefficients of an imaging lens module in accordance with a fourth preferred embodiment of the present invention;

FIG. 4C is a schematic view showing the data of optical features and aspheric surface coefficients of an imaging lens module in accordance with a fourth preferred embodiment of the present invention;

FIG. 5 is a schematic view showing the data of optical features and aspheric surface coefficients of an imaging lens module in accordance with a first, a second, a third and a fourth preferred embodiment of the present invention.

DETAILED DESCRIPTION OF THE PREFERRED EMBODIMENTS

Figure 1:
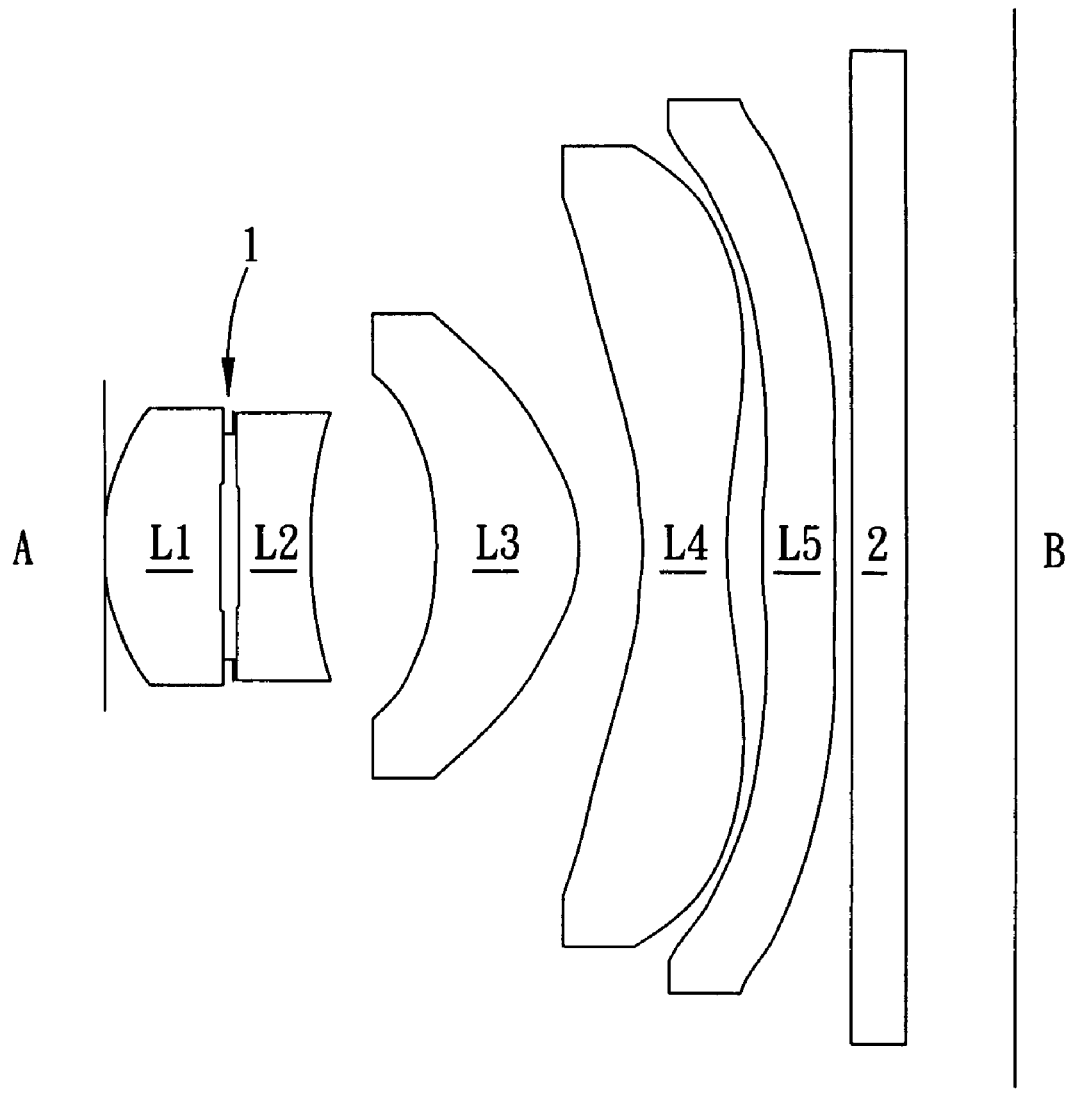
FIG. 1 is a schematic view showing an imaging lens module in accordance with a first preferred embodiment of the present invention.
Figure 2:
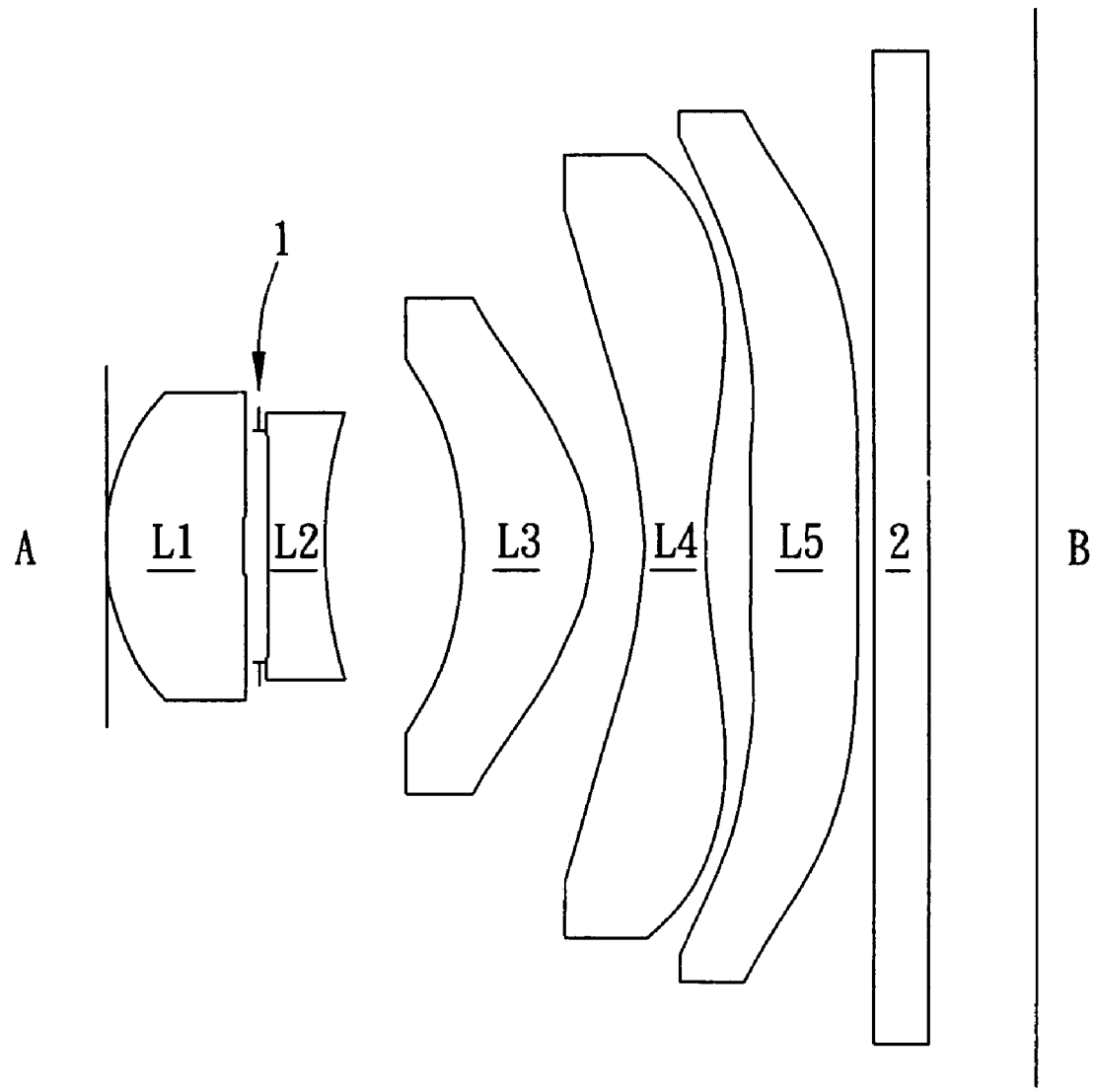
FIG. 2 is a schematic view showing an imaging lens module in accordance with a second preferred embodiment of the present invention.
Figure 3:
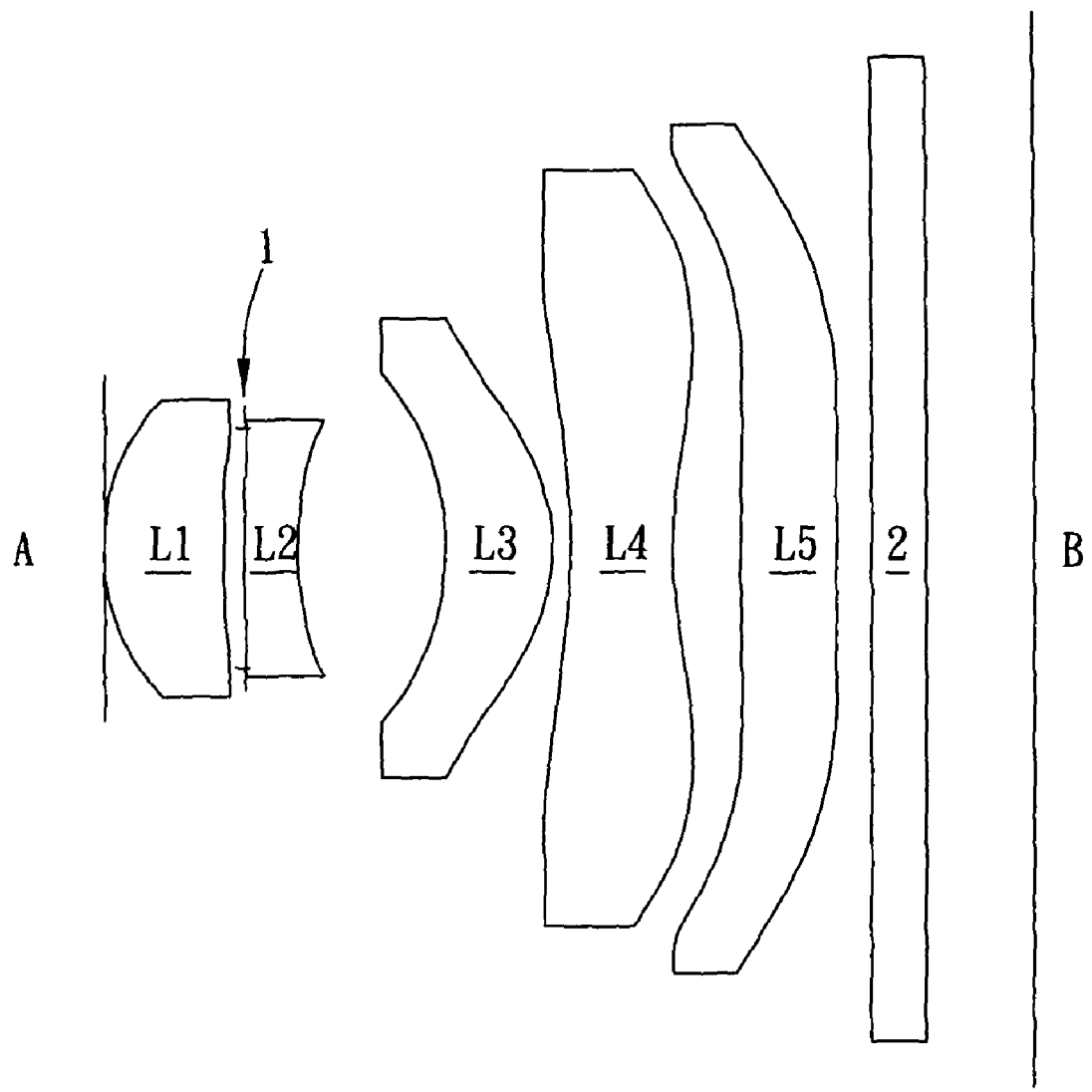
FIG. 3 is a schematic view showing an imaging lens module in accordance with a third preferred embodiment of the present invention.
Figure 4:
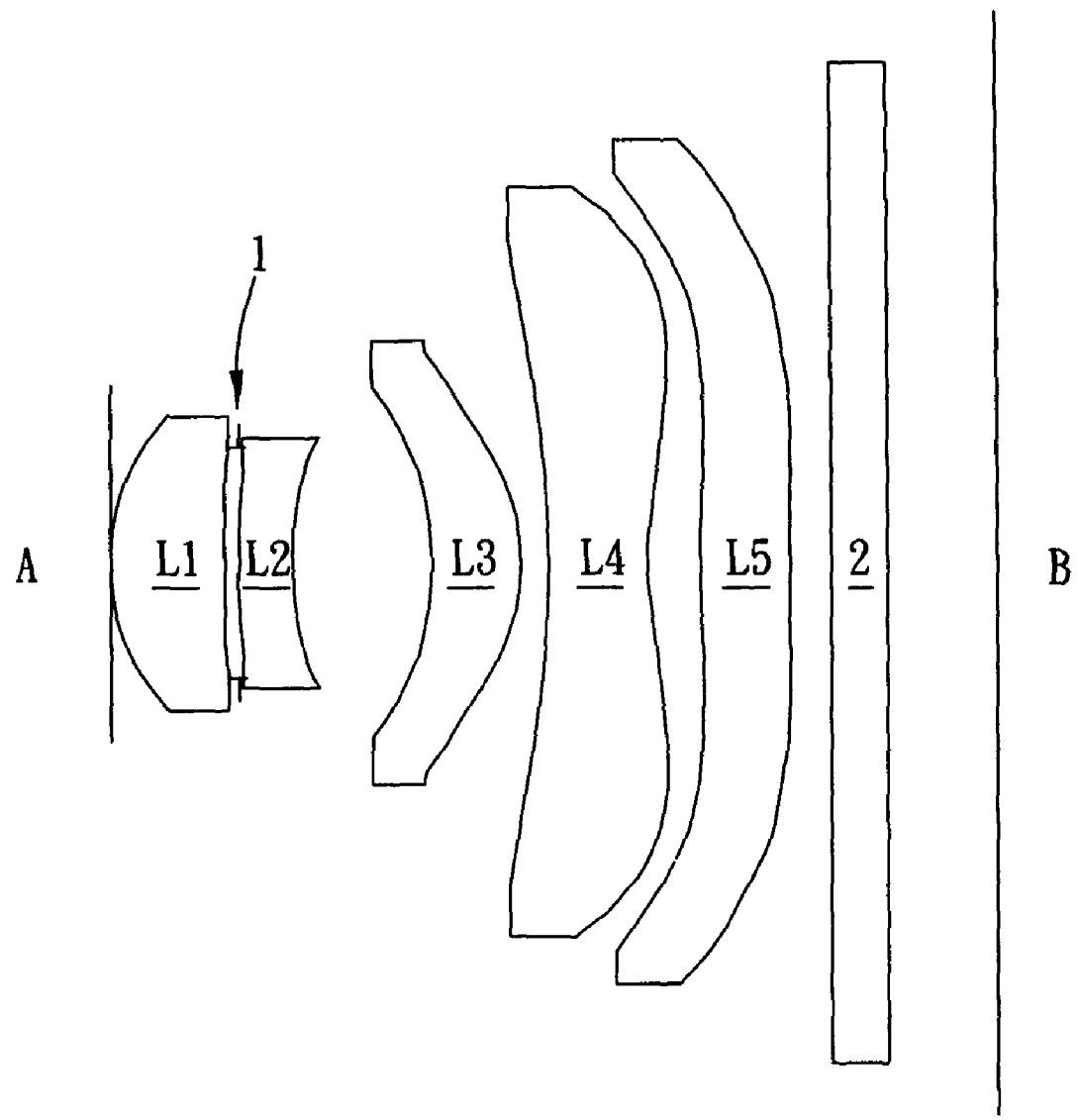
FIG. 4 is a schematic view showing an imaging lens module in accordance with a fourth preferred embodiment of the present invention.

FIGS. 1, 2, 3 and 4 show schematic views of imaging lens module lens modules in accordance with the first, second, third and fourth preferred embodiments of the present invention respectively. Each imaging lens module includes a fixed aperture diaphragm and an optical module, which includes a first lens L1, a second lens L2, a third lens L3, a fourth lens L4 and a fifth lens L5. The diaphragm 1 and the optical module are arranged from an object side to an image side in a sequence of: the first lens L1, the diaphragm 1, the second lens L2, the third lens L3, a fourth lens L4 and a fifth lens L5.

The first lens L1 has a positive refractive power, a meniscus shape, a concave surface on the image side, and having at least one aspheric surface. The second lens L2 has a negative refractive power, a meniscus shape, a concave surface on the image side, and having at least one aspheric surface. The third lens L3 has a positive refractive power, a meniscus shape, a convex surface on the image side, and having at least one aspheric surface. The fourth lens L4 has a negative refractive power, a concave surface on the object side. The fifth lens L5 has a convex on the object side near to an optic axis, and having at least one aspheric surface.

In the five-piece imaging lens module composed of five lenses in accordance to the system of the invention, a plane glass 2 is disposed behind the fifth lens L5, having a filtering infrared effect. In addition, the image side refers to a light sensor, and the light sensor is a CCD or a CMOS.

Preferably, each lens in the imaging lens module is made of a plastic material so as to cut the cost of producing and managing down. Moreover, using plastic material allows lenses to perform as the aspheric surface. The lens is used as an aspheric lens for providing a higher resolving power and reducing the number of lenses required for the imaging process.

Figure 1A:
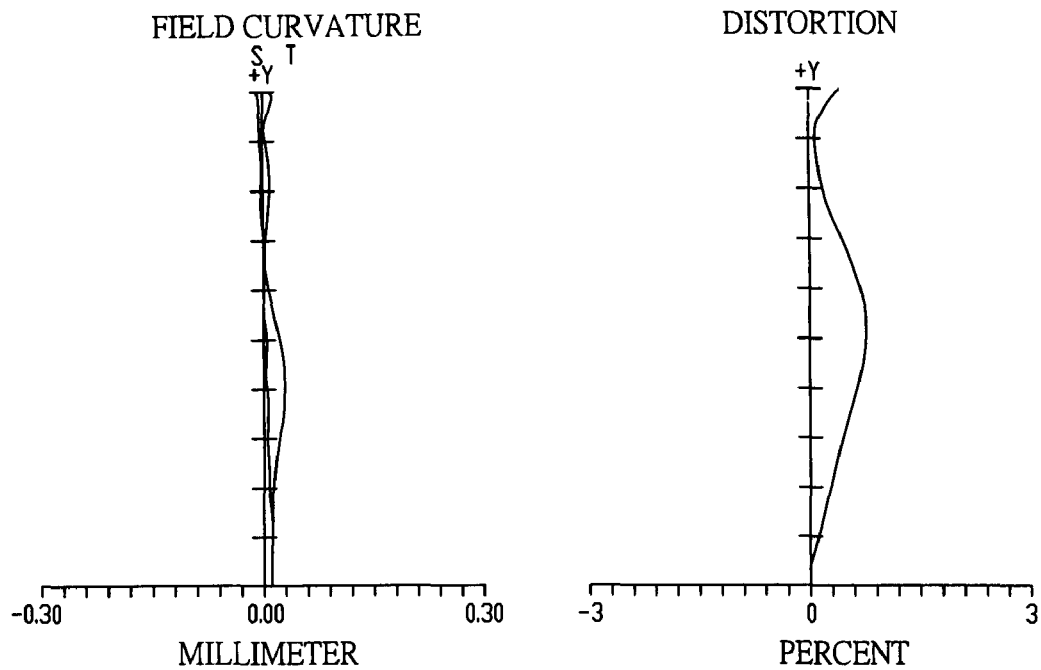
FIG. 1A is a schematic view showing the aberration of an imaging lens module in accordance with a first preferred embodiment of the present invention.
Figure 1A:
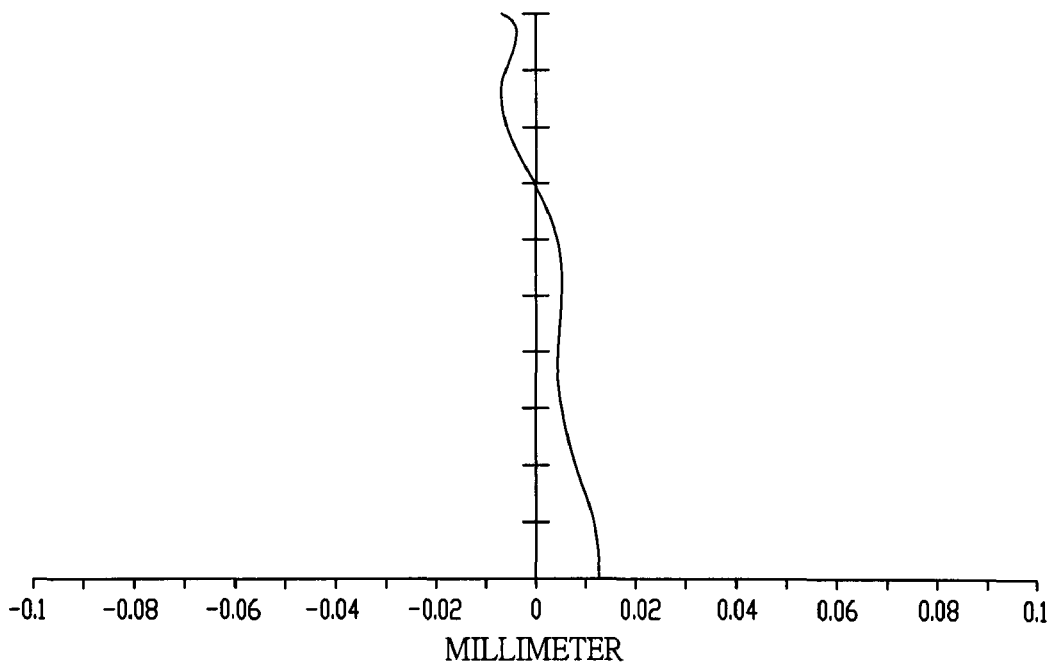
Figure 2A:
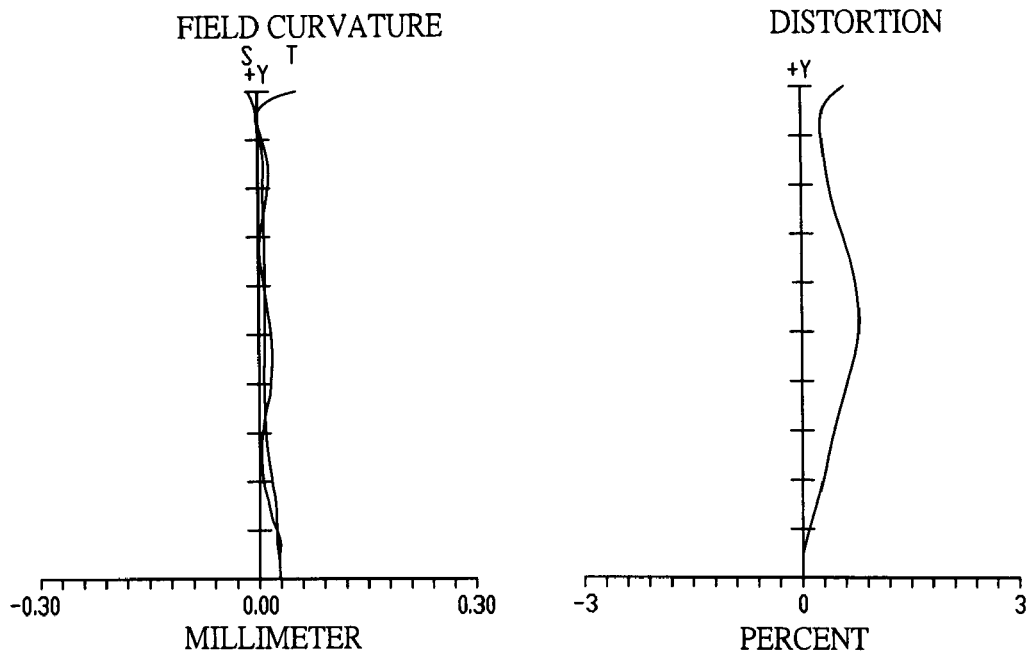
FIG. 2A is a schematic view showing the aberration of an imaging lens module in accordance with a second preferred embodiment of the present invention.
Figure 2A:
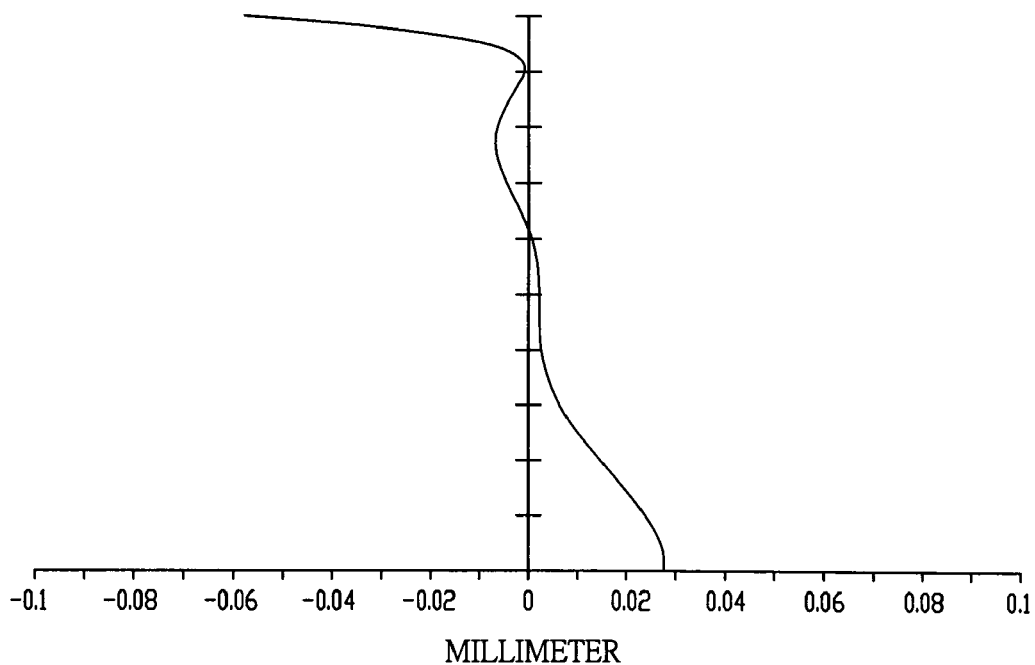
Figure 3A:
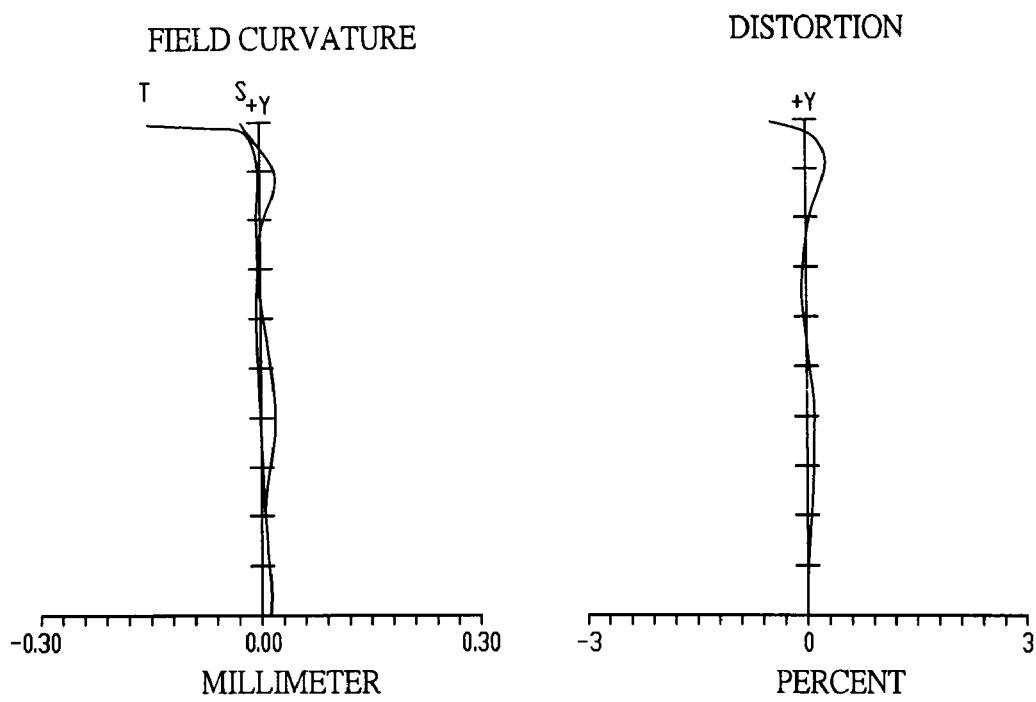
FIG. 3A is a schematic view showing the aberration of an imaging lens module in accordance with a third preferred embodiment of the present invention.
Figure 3A:
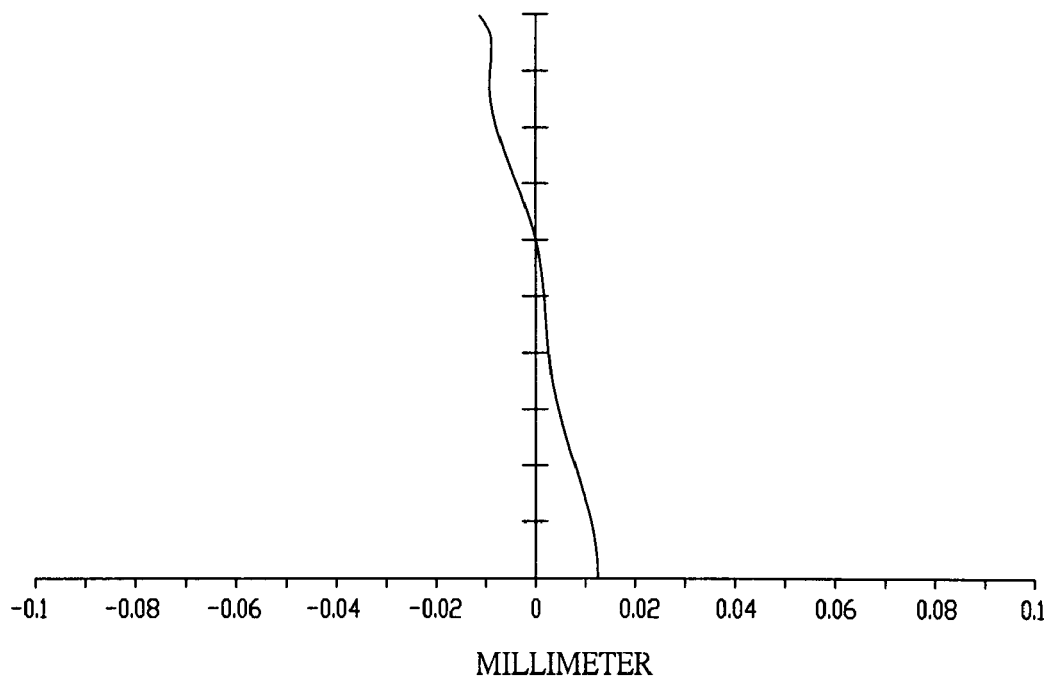
Figure 4A:
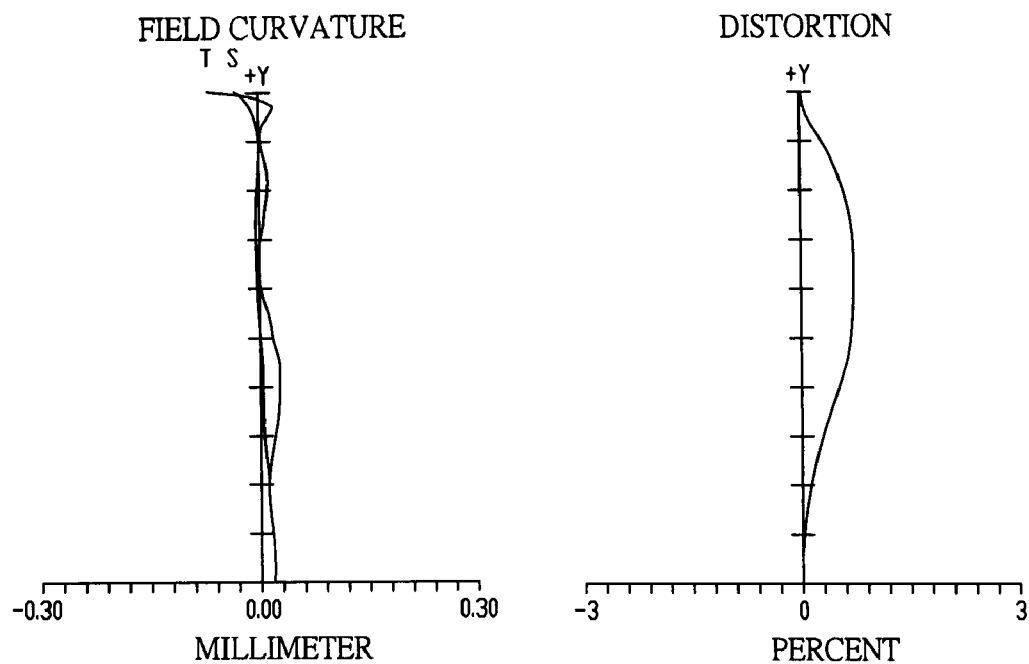
FIG. 4A is a schematic view showing the aberration of an imaging lens module in accordance with a fourth preferred embodiment of the present invention.
Figure 4A:
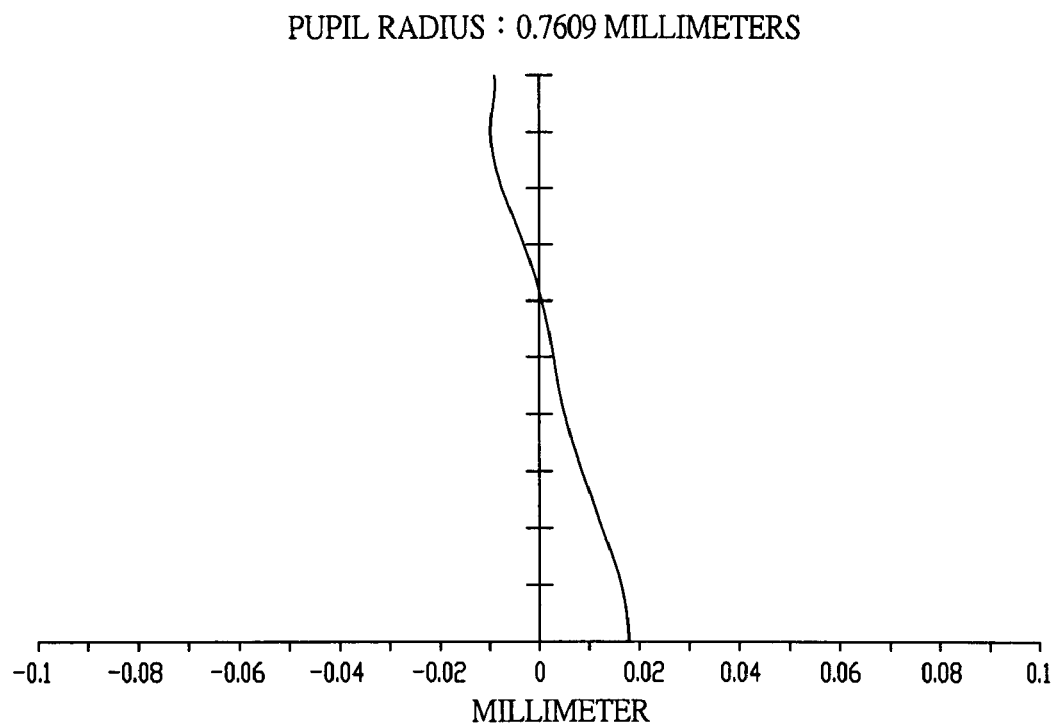

In addition, the schematic views of the aberration of the invention are non-point aberration, distorted aberration and spherical surface aberration as shown in FIG. 1A, FIG. 2A, FIG. 3A and FIG. 4A. Regardless of which aberration, the aberration relates to a data of a line d, and the non-point aberration relates to the data of an S image plane (SAGITTAL) which is related to the data of a T image plane (TANGENTIAL).

From the figures of the aberrations, the correction of the aberration of the invention is obtained completely from a simulated design, and thus there will be no problems in practical applications.

Refer to FIG. 1B, FIG. 2B, FIG. 3B, FIG. 4B, FIG. 1C, FIG. 2C, FIG. 3C, and FIG. 4C for the data of aspheric surfaces in accordance with the first, the second, the third, and the fourth preferred embodiments of the invention, the data displayed at the top are numerals representing each lens or element of the optical module of the invention.

The value of F. No. ~shows the parameter of brightness. The smaller the value of F is, the higher the brightness is.

Viewing angle: ~2ω.

Focal Length ~f: f is the overall focal length (mm) of the optical module, and 2, 3, 5, 6, 7, 8, 9, 10, 11, 12 listed below are numbers of lenses counting in a sequence starting from the object side; the surface numbers 2, 3 represent two surfaces R1, R2 of the first lens L1, the surface numbers 5, 6 represent two surfaces R1, R2 of the second lens L2, the surface numbers 7, 8 represent two surfaces R1, R2 of the third lens L3, the surface numbers 9, 10 represent two surfaces R1, R2 of the fourth lens L4, and 11, 12 represent two surfaces R1, R2 of the fifth lens L5, 13, 14 represent two surfaces of the plane glass 2.

For enhancing the imaging quality of the four-piece imaging lens module, the fifth lens is added in the present invention with a convex on the object side to satisfy a need of minimizing thickness of the lens module. Moreover, the present invention can restrain aberrations effectively to enhance the imaging quality of optical lenses and make picture qualities more excellent.

In the invention, the focal length value f1 of the first lens and the focal length value f2 of the second lens must satisfy the following relationship to achieve the best quality:

$0.25 < |f1|/|f2| < 0.9$

In the invention, the focal length value f2 of the second lens and the focal length value f3 of the third lens must satisfy the following relationship:

$0.9 < |f2|/|f3| < 2.2$

In the invention, the focal length value f3 of the third lens and the focal length value f4 of the fourth lens must satisfy the following relationship:

$0.6 < |f3|/|f4| < 1.9$

In the invention, the focal length value f4 of the fourth lens and the focal length value f5 of the fifth lens must satisfy the following relationship:

$|f4|/|f5| < 0.5$

In the invention, the refractive index N2 of the second lens and the Abbe number V2 of the second lens must satisfy the following relationship to achieve high quality of imaging:

$N2 > 1.57, V2 < 40$

In the invention, the focal length value f1 of the first lens and the compound focal length value f2345 of the second lens, the third lens, the fourth lens and the fifth lens must satisfy the following relationship:

$0.1 < |f1|/|f2345| < 1.2$

In the invention, the compound focal length value f12 of the first lens and the second lens; the compound focal length value f345 of the third lens, the fourth lens and the fifth lens. Both compound focal lengths must satisfy the following relationship:

$|f12|/|f3451| < 0.5$

In the invention, the compound focal length value f123 of the first lens, the second lens and the third lens; the compound focal length value f45 of the fourth lens and the fifth lens. Both compound focal lengths must satisfy the following relationship:

$0.5 < |f123|/|f451| < 1.5$

Also, the focal length value f of the whole lens module and the distance TL between the first surface of the first lens and an imaging surface must satisfy the following relationship:

$0.4 < |f/TL| < 1.4$

Refer to the FIG. 5, statistic data of the first, the second, the third and the fourth embodiments would be more obvious.

If the above relationship is not satisfied, the performance, the resolving power, the effect of high picture quality and the yield rate of the lens module will be decreased.

Since every lens of the lens module can have two aspheric surfaces, the shape of the aspheric surface must satisfy the condition of the following formula:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the five-piece imaging lens module of the present invention, other than the first lens L1, the second lens L2, the third lens L3 and the fourth lens L4 are manufactured with plastic LENS and shaped with aspheric surfaces, the addition of the fifth lens with a aspheric surface is a special design. By limiting the focal length value between the lenses, the imaging quality of an optical lens and the resolving power would be further upgraded. In the present invention, the brightness parameter could be increased up to F2.8. And the optical lens can obtain more light. As such, needs of a miniaturization, brighter brightness and high pixels for 3C products would be satisfied. Moreover, easier manufacture and higher yield rate would be achieved as well.

What is claimed is:

1. A five-piece imaging lens module, comprising a fixed aperture diaphragm, a first lens, a second lens, a third lens, a fourth lens and a fifth lens arranged from an object side to an image side in a sequence of:
   the first lens, having a meniscus shape, a positive refractive power, a concave surface on the image side, and having at least one aspheric surface;
   the fixed aperture diaphragm;
   the second lens, having a meniscus shape, a negative refractive power, a concave surface on the image side, and having at least one aspheric surface;
   the third lens, having a meniscus shape, a positive refractive power, a convex surface on the image side, and having at least one aspheric surface;
   the fourth lens, having a negative refractive power, a concave surface on the object side, and having at least one aspheric surface;
   the fifth lens, having a convex surface on the object side near to the optical axis, and having at least one aspheric surface.

2. The five-piece imaging lens module of claim 1, wherein $0.25 < |f1|/|f2| < 0.9$, and f1 is a focal length value of the first lens, f2 is a focal length value of the second lens.

3. The five-piece imaging lens module of claim 2, wherein $0.9 < |f2|/|f3| < 2.2$, and f2 is a focal length value of the second lens, f3 is a focal length value of the third lens.

4. The five-piece imaging lens module of claim 3, wherein $0.6 < |f3|/|f4| < 1.9$, and f3 is a focal length value of the third lens, f4 is a focal length value of the fourth lens.

5. The five-piece imaging lens module of claim 4, wherein $|f4|/|f5| < 0.5$, and f4 is a focal length value of the fourth lens, f5 is a focal length value of the fifth lens.

6. The five-piece imaging lens module of claim 5, wherein $N2 > 1.57$, $V2 < 40$, and N2 is a refractive index of the second lens, V2 is an Abbe number of the second lens.

7. The five-piece imaging lens module of claim 6, wherein $0.1 < |f1|/|f2345| < 1.2$, and f1 is a focal length value of the first lens, f2345 is a compound focal length value of the second lens, the third lens, the fourth lens and the fifth lens.

8. The five-piece imaging lens module of claim 7, wherein $|f12|/|f345| < 0.5$, and f12 is a compound focal length value of the first lens and the second lens, f345 is a compound focal length value of the third lens, the fourth lens and the fifth lens.

9. The five-piece imaging lens module of claim 8, wherein $0.5 < |f123|/|f45| < 1.5$, and f123 is a compound focal length value of the first lens, the second lens and the third lens, f45 is a compound focal length value of the fourth lens and the fifth lens.

10. The five-piece imaging lens module of claim 9, wherein $0.4 < |f/TL| < 1.4$, and f is a focal length value of the whole lens module, TL is the distance between a first surface of the first lens and an imaging surface.

11. The five-piece imaging lens module of claim 1, wherein $0.9 < |f2|/|f3| < 2.2$, and f2 is a focal length value of the second lens, f3 is a focal length value of the third lens.

12. The five-piece imaging lens module of claim 1, wherein $0.6 < |f3|/|f4| < 1.9$, and f3 is a focal length value of the third lens, f4 is a focal length value of the fourth lens.

13. The five-piece imaging lens module of claim 1, wherein $|f4|/|f5| < 0.5$, and f4 is a focal length value of the fourth lens, f5 is a focal length value of the fifth lens.

14. The five-piece imaging lens module of claim 1, wherein $N2 > 1.57$, $V2 < 40$, and N2 is a refractive index of the second lens, V2 is an Abbe number of the second lens.

15. The five-piece imaging lens module of claim 1, wherein $0.1 < |f1|/|f2345| < 1.2$, and f1 is a focal length value of the first lens, f2345 is a compound focal length value of the second lens, the third lens, the fourth lens and the fifth lens.

16. The five-piece imaging lens module of claim 1, wherein $|f12|/|f345| < 0.5$, and f12 is a compound focal length value of the first lens and the second lens, f345 is a compound focal length value of the third lens, the fourth lens and the fifth lens.

17. The five-piece imaging lens module of claim 1, wherein $0.5 < |f123|/|f45| < 1.5$, and f123 is a compound focal length value of the first lens, the second lens and the third lens, f45 is a compound focal length value of the fourth lens and the fifth lens.

18. The five-piece imaging lens module of claim 1, wherein $0.4 < |f/TL| < 1.4$, and f is a focal length value of the whole lens module, TL is the distance between a first surface of the first lens and an imaging surface.

* * * * *